Jan. 8, 1935. G. H. FULLERTON 1,987,396
HEADLIGHT AND HORN
Filed Feb. 6, 1933 2 Sheets-Sheet 1
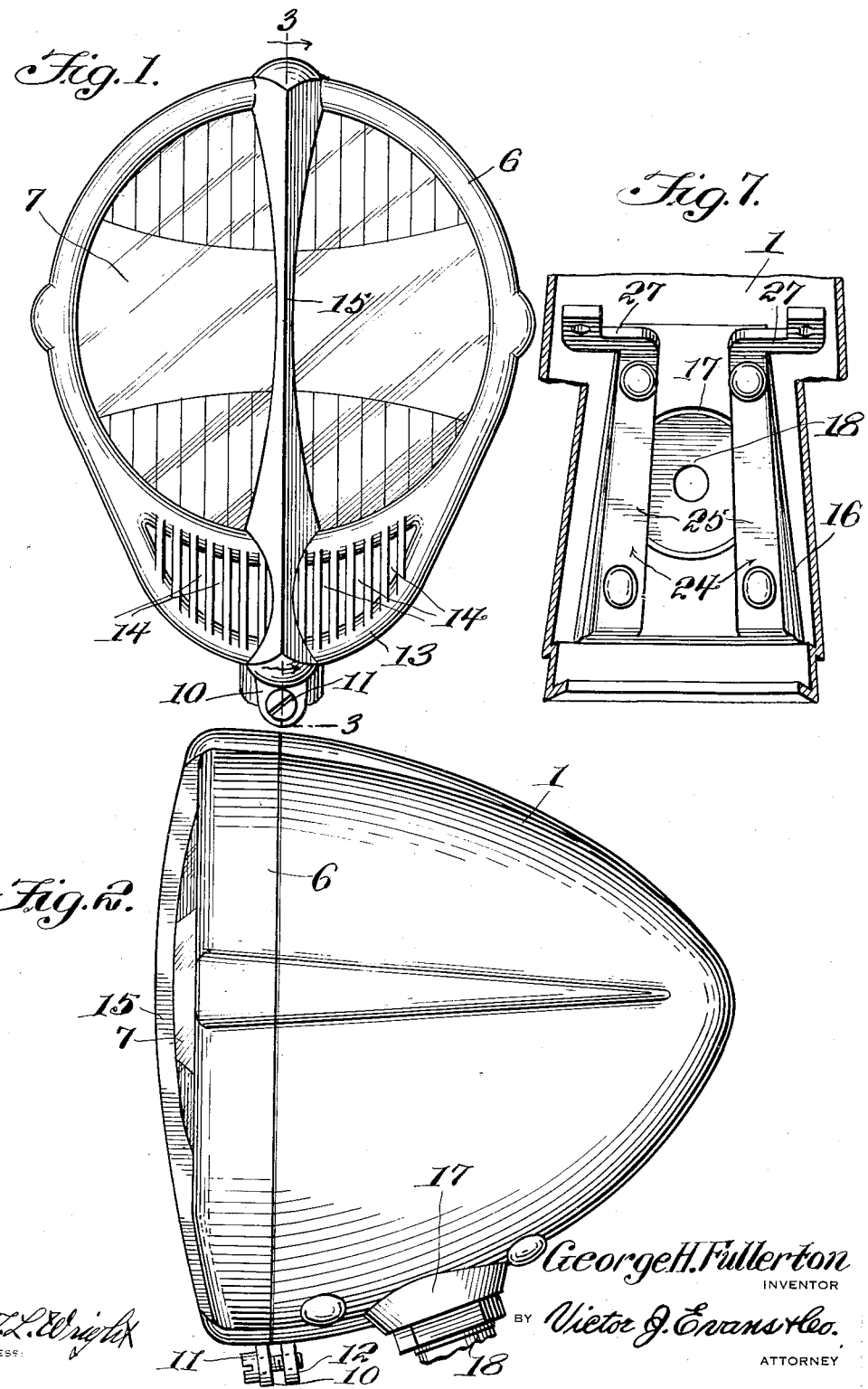

Jan. 8, 1935.  G. H. FULLERTON  1,987,396
HEADLIGHT AND HORN
Filed Feb. 6, 1933   2 Sheets-Sheet 2
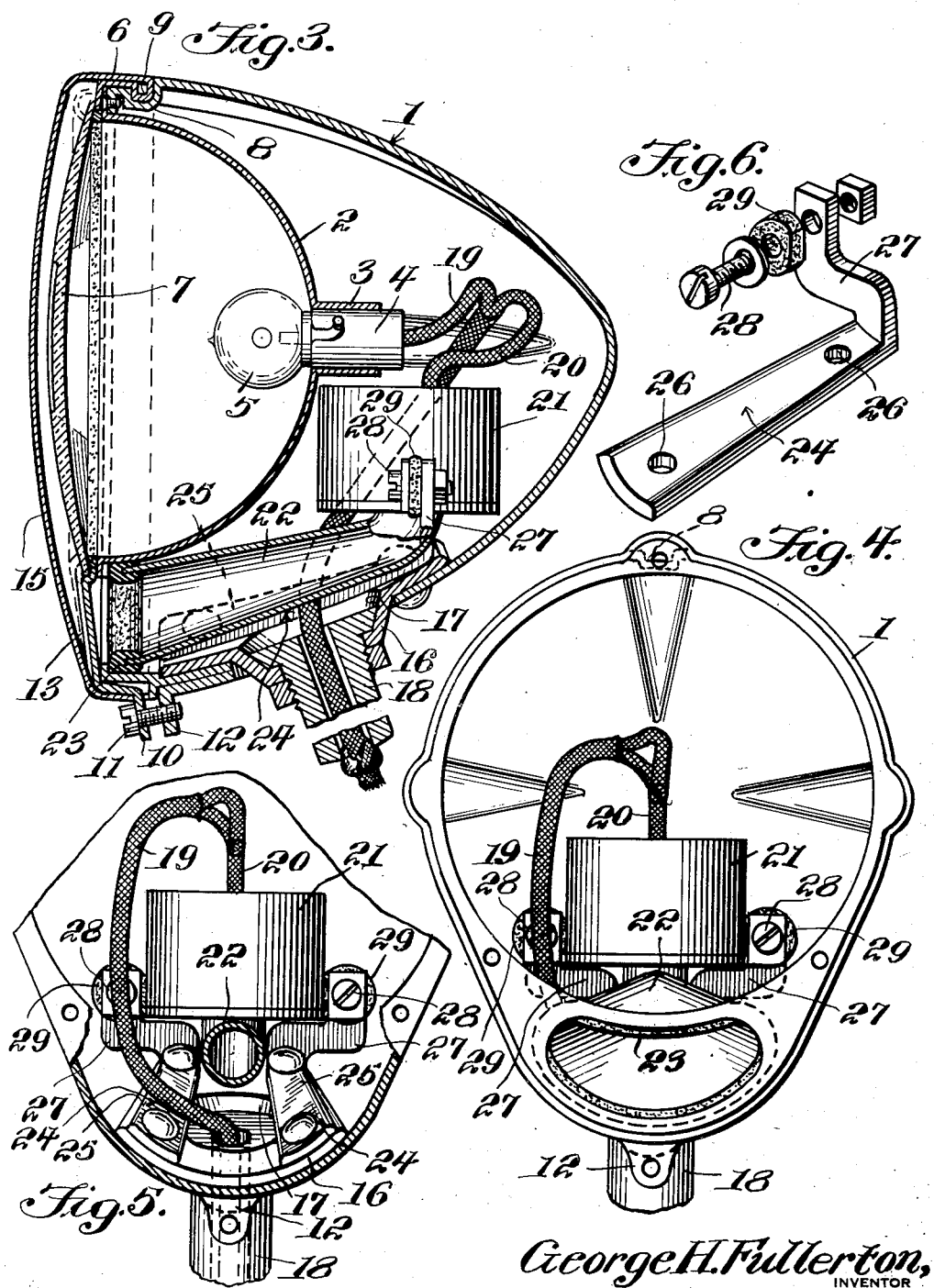

Patented Jan. 8, 1935

1,987,396

UNITED STATES PATENT OFFICE 1,987,396

HEADLIGHT AND HORN

George H. Fullerton, Pitcairn, Pa.

Application February 6, 1933, Serial No. 655,525

1 Claim. (Cl. 177—7)

This invention relates to combined headlights and horns for motor vehicles and has for the primary object, the provision of a device of the above stated character wherein the horn is confined within the casing of a headlight to eliminate separate installation of the horn of the motor vehicle and thereby reduce the number of parts and conceal the horn from view and protect the latter from injury and weather elements and permit the construction and finish of the horn from less costly material.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a front elevation illustrating a combined headlight and horn constructed in accordance with my invention.

Figure 2 is a side elevation illustrating the same.

Figure 3 is a sectional view taken on the line 3—3 of Figure 1.

Figure 4 is a front elevation illustrating the horn located within the casing of the headlight and having the supporting rim and lens of the headlight removed from the casing.

Figure 5 is a fragmentary sectional view illustrating the supporting of the horn in the casing of the headlight.

Figure 6 is a perspective view illustrating one of the supporting brackets.

Figure 7 is a fragmentary sectional view illustrating the arrangement of the supporting brackets within the casing of the headlight prior to attaching the horn to said bracket.

Referring in detail to the drawings, the numeral 1 indicates a headlight casing of any desired shape and which has removably supported therein a reflector 2 provided with a sleeve 3 for supporting an electric light socket 4 carrying an electric light 5 arranged in advance of the reflector 2. A removable rim 6 is provided with the casing 1 and supports a lens 7 in advance of the reflector. The casing in its upper wall is provided with a depression to form a seat 8 which receives a hook-shaped extension 9 on the rim 6. The lower portion of the rim is provided with an ear 10 carrying a fastener 11 to engage with an ear 12 on the casing cooperating with the extension 9 and detachably securing the rim to the casing. The casing 1 at its lower portion is shaped to form a chamber below the reflector and said chamber is overlapped by the portion 13 of the rim and said portion is provided with relatively spaced slots 14 providing sound openings to permit escape of sound from the interior of the casing. The slots 14 are so arranged as to harmonize with the general design of the rim and casing. To add to the artistic appearance of the front of the headlight, the rim is provided with an artistic bar 15. The lower wall of the casing 1 is provided with an opening to receive an attaching bracket 16 suitably secured to the casing and provided with a seat 17 to receive the upper or headed end of a hollow standard or supporting post 18 through which the electrical conductors extend for furnishing electricity to the electric lamp 5. The electrical conductors are mounted in a cable 19 also carrying electrical conductors 20 for supplying electricity to an electrical horn 21, the bell of which is shown at 22, and located in the chamber of the casing. The forward end of the bell is located rearwardly of the sound openings 14 and carries a cushion 23 engageable with the walls of the casing and the reflector 2. Located in the casing and adjacent the bracket 16 are horn brackets 24 suitably secured to the casing and each including an attaching shank 25 provided with openings 26 to receive fasteners for securing the shank to the casing 1. One end of the shank is bent angularly to form a substantially L-shaped attaching arm 27. The arms 27 of the brackets 24 extend in opposite directions to lie at opposite sides of the horn 21 and are apertured to receive fasteners 28 which attach to the arms the horn 21. Cushion gaskets 29 are carried by the fasteners 28 cooperating with the cushion 23 to prevent vibration from the horn acting on the reflector, electric light 5 and other parts of the device.

From the foregoing description taken in connection with the accompanying drawings it will be seen that the horn is confined within the casing 1 of the headlight to be protected from injury and foreign matter and obviates the necessity of employing fittings to attach the horn to some part of the vehicle such as under the hood or in advance of the radiator of the vehicle as customary. By positioning the horn within the lamp casing wind resistance is materially reduced to the vehicle and as it is customary to employ a pair of headlights to each motor vehicle, with the present invention it permits the use of matched horns for the vehicle. This arrangement as heretofore described permits the horn to be manufactured at a lower cost due to the fact that expensive finish to the horn is unnecessary. Also less expensive material may be employed in construction of the horn. The headlight described is applicable to any type of motor vehicle and due to the described arrangement of parts, the horn is supported to the vehicle by the headlight, eliminating expensive fixtures for separate attachment to the vehicle.

While I have shown and described the preferred embodiment of my invention, it will be understood that minor changes in construction, combination and arrangement of parts may be made without departing from the spirit and scope of my invention, as claimed.

Having described the invention, I claim:

In combination with a headlight casing having sound and light openings located in the same side of said casing and a light reflector mounted in said casing and spaced from the bottom wall of said casing, elongated brackets secured to the bottom wall of the casing and having lateral offset ends disposed rearwardly of the reflector, a horn including an operating portion and a bell portion located over the brackets with the operating portion positioned rearwardly of the reflector and the bell portion extending from said operating portion to the sound opening between the reflector and the casing, a sound deadening element mounted on the bell portion and engaging the casing and the reflector, and a sound deadening fastening means between said ends of the brackets and the operating portion of the horn.

GEORGE H. FULLERTON.